Feb. 20, 1945.  B. S. SPEEROS  2,369,760
INTERNATIONAL TIME DESIGNATOR
Filed May 24, 1944

Inventor
Basil S. Speeros
By
A. Yates Dowell
Attorney

Patented Feb. 20, 1945

2,369,760

UNITED STATES PATENT OFFICE 2,369,760

INTERNATIONAL TIME DESIGNATOR

Basil S. Speeros, Washington, D. C.

Application May 24, 1944, Serial No. 537,121

4 Claims. (Cl. 35—44)

This invention relates to an international time designator and more particularly an object of the invention is to provide dial and indicator equipment for rapidly determining the time on different points of the globe.

Time dials have been applied to globes heretofore, so as to be rotated as desired with respect to the polar axis, also by means of time controlled mechanism. However, such operation of the time dials is objectionable for the purposes of the present invention and as a further object of the present invention it is aimed to provide a time dial and mounting therefore which will yieldably hold the time dial in any desired hour position of the day with respect to a globe, though, preferably, a flat chart or map of the world whereby the time dial may be set as desired and will accurately correspond with the longitudinal or time zones of the map. The map as disclosed herein is a polar projection with the time dial mounted on the polar point of the map though variations thereof may be adopted, as will be understood.

Another object of the invention is to provide an indicator such as a strip or pointer mounted coaxially with a time dial preferably of the type just referred to and to provide friction means for yieldably maintaining the indicator along any desired longitudinal line through a selected geographical point on the map.

With these and other objects in view it will be seen that the indicator may be set with respect to a selected geographical point as a point of reference, the time dial also set with the required international hour time corresponding with the indicator, and after which the indicator may be swung to any other geographical point and the time at such point with respect to the time of the point of reference will be indicated by the indicator on the time dial.

Figure 1:
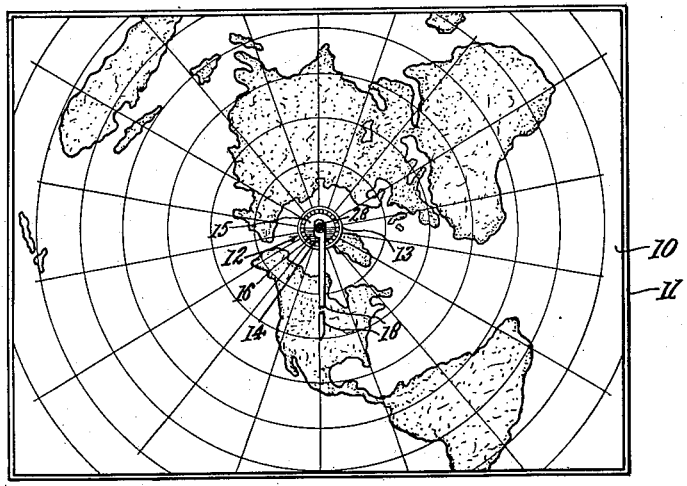

Further objects and advantages of the invention will be apparent from the following description taken in conjunction with the accompanying drawing, wherein:

Figure 1 is a plan view of a base member with a polar projection map thereon and an international time designator in accordance with my invention.

Figure 2:
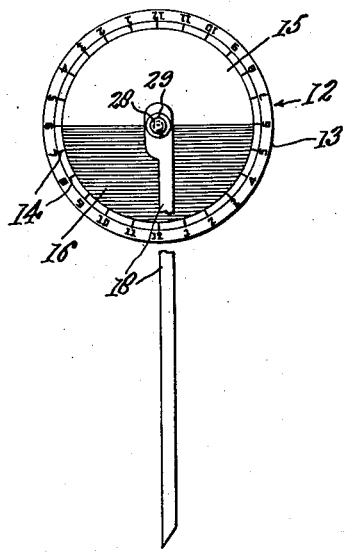
Figure 3:
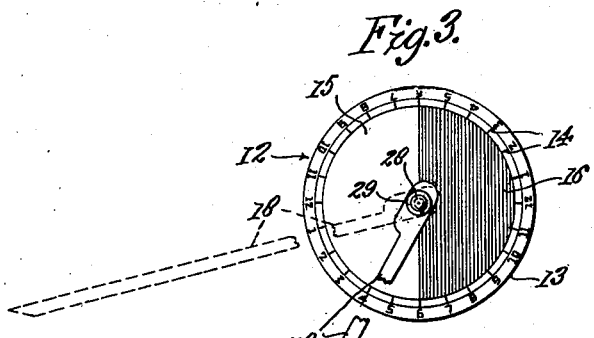
Figure 4:
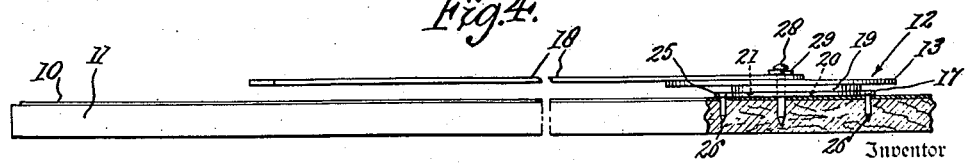

Figs. 2 and 3, enlarged plan views of the international time designator with parts in different positions;

Fig. 4, an elevation view of the base and map partly in section to show the mounting of the international time designator.

Figure 6:
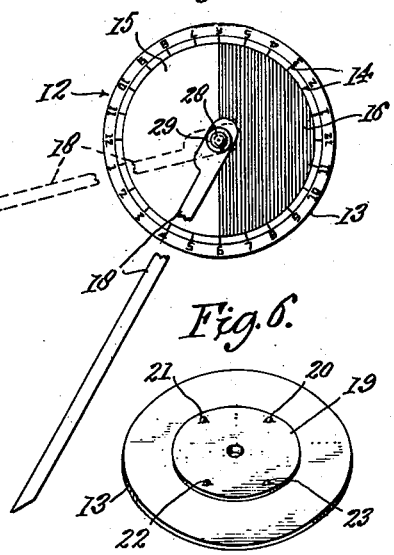
Figure 5:
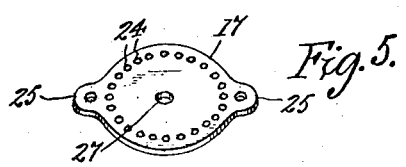

Fig. 5, a perspective view of a base element upon which the time dial of the international time designator is mounted; and Fig. 6, a perspective view of the underside of the time dial element of the international time designator.

In general the invention, in a preferred form, includes a map 10 mounted on a flat base 11 of composition, wood, card board or any desired material. Map 10, as illustrated shows the continents in outline and some of the main islands in polar projection with longitudinal lines extending radially from the North Pole. In practice on a larger scale many other geographical features are shown, including main cities and others, as will be readily understood.

The international time designator 12 comprises a time dial 13 having hour designations 14, and day and night sections 15 and 16 thereon, a stationary base element 17 and an indicator or pointer 18.

Time dial 13, as illustrated in Fig. 6 has on its under side a disk 19 having four projections 20, 21, 22 and 23 arranged in a circular path for normally penetrating openings or depressions 24 in base element 17 with which they are arranged to cooperate. It will be observed that there are preferably twenty-four such openings or depressions 24 in base element 17 and that they are spaced so as to correspond with the hours of the time designations 14 on the face of the time dial 13. Base element 17 has extensions 25 apertured for receiving brads 26 screws or the like for fixedly mounting it on base 10 with its central opening 27 directly over the polar point of map 10, the base element being so mounted that when dial 13 is mounted over it, the hour designation of time will correspond with the international time lines not shown on the map, though the map for purposes of illustration is divided by longitudinal lines at 20°.

In mounting time dial 13 and the indicator 18 over base element 17, a pivot element 28, as shown in the form of a nail, is passed through a yieldable spring or split washer 29, thence through the indicator pointer 18, time dial 13, and base element 17 and into base 11 which yieldably maintains the elements in position. The spring washer permits the indicator pointer 18 to be swung to any desired position and frictionally maintains it in such selected position. At the same time this washer maintains the time dial 13 with the downwardly extending projections 20, 21, 22 and 23 in several of the apertures 24 of base element 17 and yields to permit them to rise from the apertures and be swung to another set of apertures whereby the time dial 13 is held in 24 hour positions with respect to map 10. As a variation however the points or projections 20, 21, 22, 23 may be spaced so that one at a time will engage a single aperture whereby the time dial 13 is settable to time by the quarter hour intervals instead of hour intervals, though hour intervals corresponding with international hour time is sufficient for most purposes.

In operation, the time dial is set in accordance with the required time at any desired point, in accordance with the international time zone for that point, or it may be set in conjunction with the indicator pointer 18 positioned alongside that point. Then by moving the indicator pointer 18 to alongside another point where it is desired to determine the corresponding time, the time of that point will be indicated on time dial 13 in conjunction with indicator pointer 18. Other modes of operation of this international time designator may be employed if desired.

It will be understood that certain minor changes in construction and design may be adopted without departing from the spirit or scope of the invention as defined by the appended claims.

What is claimed is:

1. An international time designator comprising, a base with a map thereon, a time dial pivoted to the base at the polar point of the map, means for yieldingly holding said time dial in a circular series of relative fixed positions with respect to the map, and an indicator pointer frictionally held with respect to said pivoted time dial and operable to be swung therearound to any desired position with respect to the map and time dial.

2. An international time designator comprising, the combination with a time dial and an indicator pointer mounted for rotary movement on the polar point of a map, of means for yieldably holding said time dial in any of a circular series of fixed positions with respect to the map and for frictionally maintaining said indicator pointer in any desired position with respect to the map and time dial.

3. An international time designator comprising, a base with a polar map thereon, a base element mounted on said base centrally over the polar point of the polar map and having a circular series of depressions therein corresponding with the twenty-four hours of the day, a pivot extending through said base element and the polar point of the map into said map base, a time dial on said pivot, a disk on the underside of said time dial having projections thereon for engagement with the depressions in said base element, an indicator pointer on said pivot, and a spring washer element carried by said pivot over said time dial and indicator pointer for yieldably maintaining said time dial and indicator in various positions with respect to each other and the polar map.

4. An international time designator in accordance with claim 3 wherein the projections on the disk on the under side of the time dial are differently spaced with respect to the spacing of the depressions in the base element whereby the time dial may be set to fractional parts of the hour with respect to the polar map.

BASIL S. SPEEROS.